(12) United States Patent
Shibayama et al.

(10) Patent No.: US 8,684,401 B2
(45) Date of Patent: Apr. 1, 2014

(54) SIDE AIRBAG APPARATUS

(71) Applicant: Toyoda Gosei Co., LTD., Kiyosu (JP)

(72) Inventors: Koji Shibayama, Kiyosu (JP); Michiyasu Ito, Kiyosu (JP); Yuji Sato, Kiyosu (JP); Kensaku Honda, Kiyosu (JP); Masashi Hotta, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/625,307

(22) Filed: Sep. 24, 2012

(65) Prior Publication Data

US 2013/0076013 A1    Mar. 28, 2013

(30) Foreign Application Priority Data

Sep. 28, 2011   (JP) .................................. 2011-212712
Aug. 30, 2012   (JP) .................................. 2012-190124

(51) Int. Cl.
*B60R 21/207*   (2006.01)
*B60R 21/237*   (2006.01)
*B60R 21/231*   (2011.01)

(52) U.S. Cl.
CPC ............. *B60R 21/237* (2013.01); *B60R 21/207* (2013.01); *B60R 21/23138* (2013.01)
USPC ....................... 280/730.2; 280/742; 280/743.1

(58) Field of Classification Search
USPC ..................... 280/730.2, 729, 736, 742, 743.1
See application file for complete search history.

(56) References Cited

U.S. PATENT DOCUMENTS

| | | | |
|---|---|---|---|
| 5,730,463 A * | 3/1998 | Fisher et al. | 280/743.1 |
| 6,110,094 A | 8/2000 | Wallentin et al. | |
| 6,186,534 B1 * | 2/2001 | Heinz | 280/728.2 |
| 7,770,921 B2 * | 8/2010 | Mueller et al. | 280/739 |
| 7,946,616 B2 * | 5/2011 | Ochiai et al. | 280/730.2 |
| 8,328,227 B2 * | 12/2012 | Shimono | 280/729 |
| 2005/0006883 A1 * | 1/2005 | Sato et al. | 280/730.2 |

(Continued)

FOREIGN PATENT DOCUMENTS

| | | |
|---|---|---|
| JP | A-H11-091488 | 4/1999 |
| JP | A-H11-115666 | 4/1999 |

(Continued)

OTHER PUBLICATIONS

Shibayama et al., Side Airbag Device, Jan. 13, 2011, JPO, JP 2011-5908 A, Machine Translation of Description.*

(Continued)

*Primary Examiner* — James English
(74) *Attorney, Agent, or Firm* — Posz Law Group, PLC

(57) ABSTRACT

The airbag has a front portion, in which a front chamber is formed, a rear portion, in which a rear chamber is formed, and a partition, which partitions the front and rear chambers from each other. The partition has a communication passage for connecting the front and rear chambers to communicate to each other. A pressure regulating valve is located in the passage. At an early stage of a supply period during which an inflator supplies inflation gas to the airbag, the valve is closed to restrict flow of the inflation gas from the rear chamber to the front chamber via the passage. The valve is opened during the supply period to permit the inflation gas to flow therethrough. A front portion of the airbag is roll-folded, while a rear portion is accordion-folded. The airbag front portion and the airbag rear portion are located in front of the inflator.

8 Claims, 7 Drawing Sheets

(56) References Cited

U.S. PATENT DOCUMENTS

| | | | |
|---|---|---|---|
| 2006/0255572 A1* | 11/2006 | Svenbrandt et al. | 280/730.2 |
| 2007/0284858 A1* | 12/2007 | Nishimura et al. | 280/729 |
| 2007/0284859 A1 | 12/2007 | Kashiwagi | |
| 2012/0025499 A1* | 2/2012 | Shibayama et al. | 280/730.2 |
| 2012/0181780 A1* | 7/2012 | Rickenbach et al. | 280/730.2 |

FOREIGN PATENT DOCUMENTS

| | | |
|---|---|---|
| JP | A-H11-152004 | 6/1999 |
| JP | A-2000-514752 | 11/2000 |
| JP | A-2003-104155 | 4/2003 |
| JP | A-2004-203272 | 7/2004 |
| JP | A-2007-331401 | 12/2007 |
| JP | A-2009-255706 | 11/2009 |
| JP | 2011005908 A * | 1/2011 |
| JP | 2011031719 A * | 2/2011 |

OTHER PUBLICATIONS

Shibayama et al., Side Airbag Device, Jan. 13, 2011, JPO, JP 2011-5908 A, English Abstract.*

* cited by examiner

Fig.5
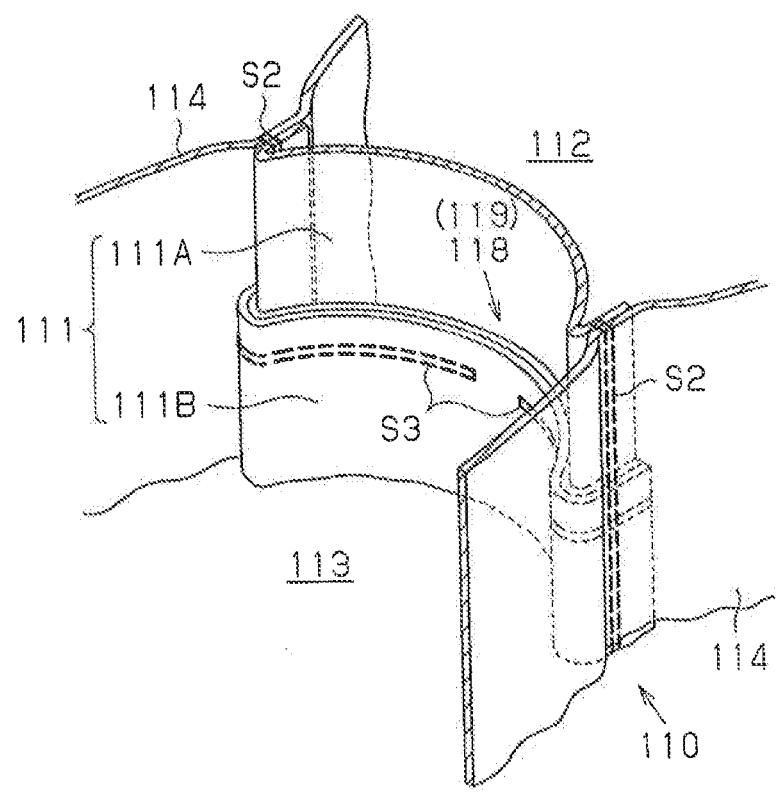
Fig.6a
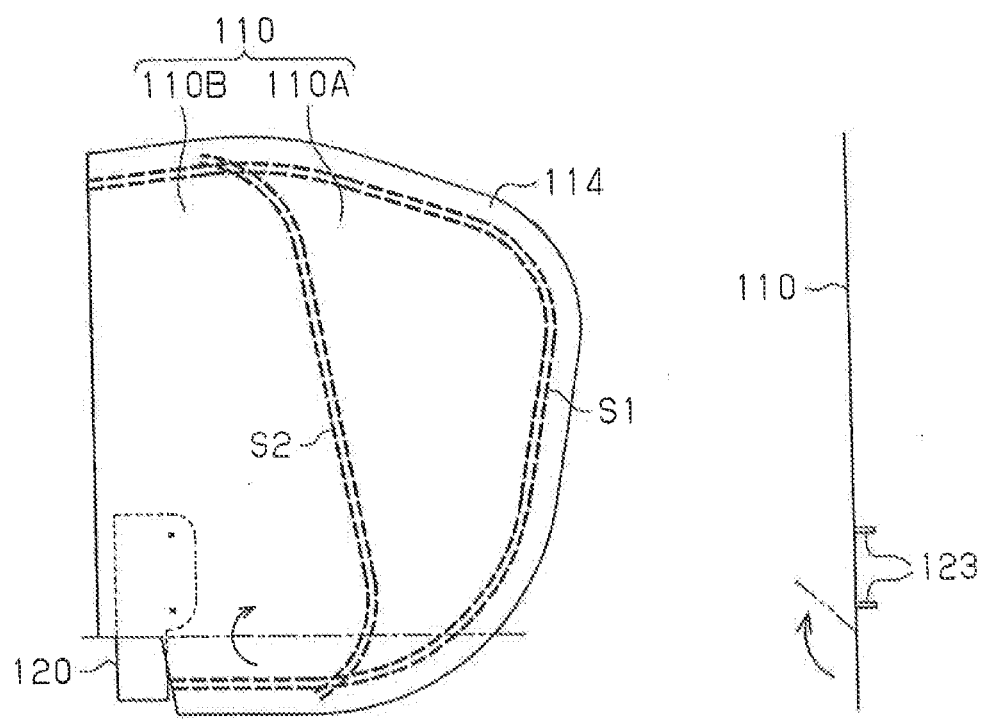
Fig.6b

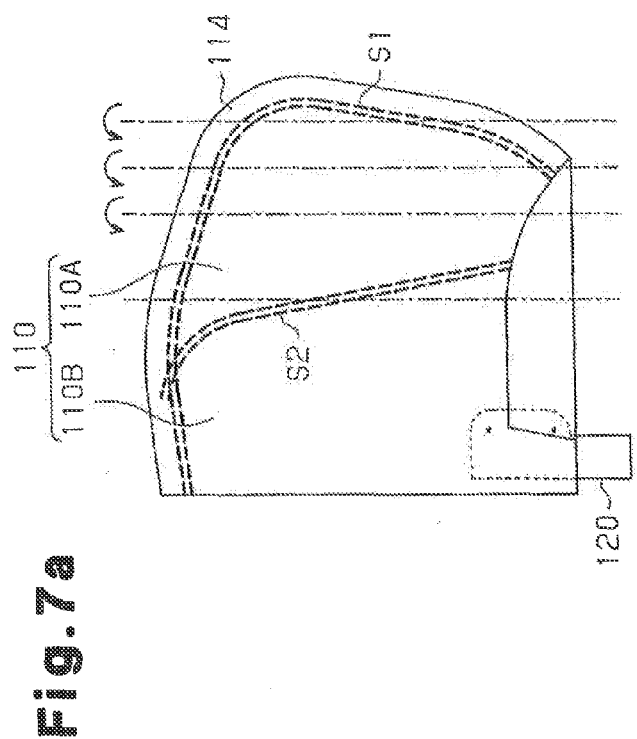
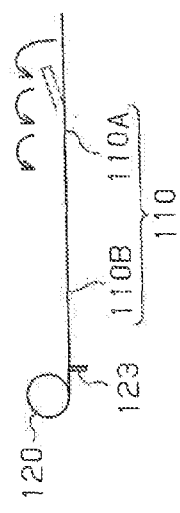
Fig.7a
Fig.7b
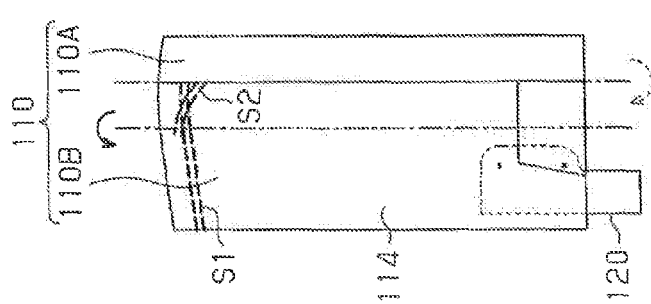
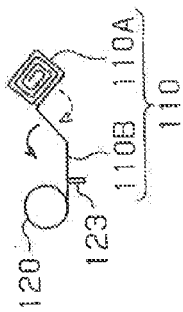
Fig.8a
Fig.8b

SIDE AIRBAG APPARATUS

BACKGROUND OF THE INVENTION

The present invention relates to a side airbag apparatus that deploys and inflates an airbag beside an occupant seated in a vehicle seat to reduce an impact applied from the side, thereby protecting the occupant.

Apparatuses for protecting an occupant from an impact applied from the side of a vehicle, for example, due to a side collision have been known as disclosed in Japanese Laid-Open Patent Publication No. 2007-331401 and Japanese Laid-Open Patent. Publication No. 11-91486. These publications disclose side airbag apparatuses that deploy and inflate an airbag toward a side of an occupant from the backrest of a vehicle seat.

Such a side airbag apparatus includes an airbag module, which is formed by an inflation fluid generator that ejects inflation fluid and an airbag that accommodates the inflation fluid generator and is folded toward the inflation fluid generator. The airbag module is accommodated in the backrest of a seat.

According to the above described side airbag apparatus, when a sensor detects that an impact from the side of the vehicle (seat) is applied, the inflation fluid generator ejects inflation fluid, so that the pressure of the inflation fluid deploys and inflates the airbag. The airbag pops out from the backrest to enter the gap between the occupant seated in the seat and the wall of the passenger compartment. The airbag, which has been deployed and inflated, is located between the passenger compartment side wall and the occupant, restrains the occupant, and reduces and absorbs the impact transmitted to the occupant. Accordingly, the occupant is protected from impact.

In such a side airbag apparatus, it is preferable that the rear portion of the airbag, which is relatively closer to the backrest, be inflated early to quickly restrain and protect an occupant and that deployment of the front portion of the airbag be performed prior to its inflation so that the airbag quickly enters the gap between the occupant and the wall of the passenger compartment. In this respect, Japanese Laid-Open Patent Publications No. 2007-331401 and No. 11-91488 each disclose a side airbag apparatus in which the rear portion of an airbag is folded by according-folding, in which the direction of folding is alternately changed, and the front portion is folded by roll-folding, in which the airbag is folded repeatedly in one direction.

However, in the side airbag apparatuses disclosed in Japanese Laid-Open Patent Publications No. 2007-331401 and No. 11-91488, since an inflation fluid supply source supplies inflation fluid to an airbag, which is formed by a single chamber, the rear portion and the front portion of the airbag are both deployed and inflated at an early stage. Thus, if there is an obstacle in front of the airbag, the rear portion and the front portion may be prevented from being properly deployed and inflated. The rear portion of the airbag therefore may fail to quickly restrain and protect an occupant.

SUMMARY OF THE INVENTION

Accordingly, it is an objective of the present invention to provide a side airbag apparatus that is capable of quickly restraining and protecting an occupant with a rear portion of the airbag even if there is an obstacle in front of the airbag.

To achieve the foregoing objective, and in accordance with one aspect of the present invention, a side airbag apparatus for being installed in a seat of a vehicle is provided. The side airbag apparatus includes an airbag and an inflation fluid generator. The airbag includes a front portion, in which a front chamber is formed, a rear portion, in which a rear chamber is formed, and a partition, which partitions the front chamber and the rear chamber from each other. The inflation fluid generator is accommodated in the rear chamber and supplies inflation fluid to the airbag. The partition is provided with a communication passage, which connects the front chamber and the rear chamber to each other. The communication passage is provided with a pressure regulating valve. At an early stage of a supply period during which the inflation fluid generator supplies the inflation fluid to the airbag, the pressure regulating valve is closed to restrict flow of the inflation fluid from the rear chamber to the front chamber via the communication passage. The pressure regulating valve is opened during the supply period to permit the inflation fluid to flow therethrough. The front portion of the airbag is folded toward the inflation fluid generator by roll-folding, in which the airbag front portion is repeatedly folded in one direction. The rear portion of the airbag is folded toward the inflation fluid generator by accordion-folding, in which the direction of folding is alternately changed. The roll-folded airbag front portion and the accordion-folded airbag rear portion are located in front of the inflation fluid generator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a perspective view showing a pressure regulating valve provided in the partition in the airbag and its surroundings;

FIG. 6a is a side view showing a method for folding the airbag of the side airbag apparatus of the embodiment shown in FIG. 1;

FIG. 6b is a schematic diagram illustrating the airbag of FIG. 6a as viewed from the front of the vehicle;

FIG. 7a is a side view showing a method for folding the front portion of the airbag;

FIG. 7b is a schematic diagram illustrating the airbag as viewed from the bottom;

FIG. 8a is a side view showing a method for folding the rear portion of the airbag;

FIG. 8b is a schematic diagram illustrating the airbag as viewed from the bottom;

DETAILED DESCRIPTION OF THE PREFERRED EMBODIMENTS

A side airbag apparatus according to one embodiment of the present invention will now be described with reference to FIGS. 1 to 11b.

Figure 1:
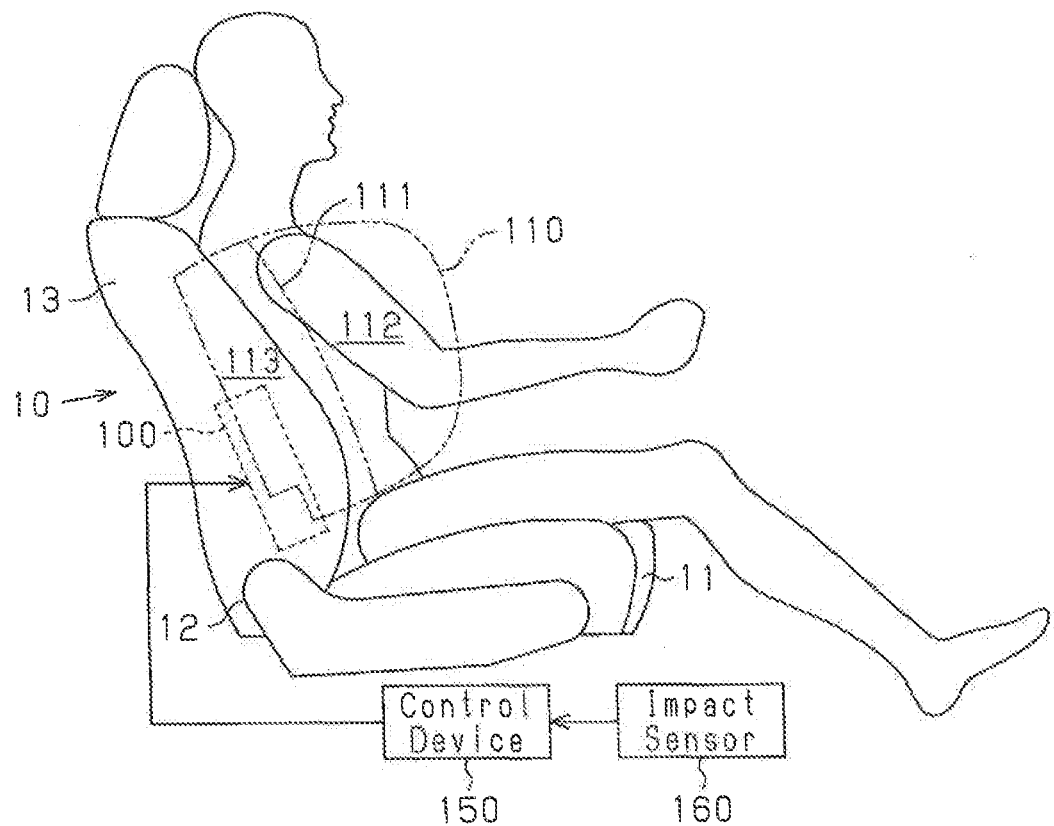
FIG. 1 is a diagram schematically showing the structure of a side airbag apparatus according to one embodiment of the present invention.

FIG. 1 is a diagram schematically showing the structure of a side airbag apparatus according to the present embodiment. FIG. 1 is a side view of a seat 10 of a vehicle in which the side airbag apparatus is installed. In FIG. 1, the right side corresponds to the front side of the vehicle, and the upper side corresponds to the upside of the vehicle.

As shown in FIG. 1, a backrest 13 is coupled to a seat portion 11 of the seat 10 via a hinge 12. The seat 10 is structured to allow an occupant to be seated at a seating position on the seat portion 11. As indicated by a broken line in FIG. 1, an airbag module 100 of the side airbag apparatus according to the present embodiment is accommodated in the backrest 13 of the seat 10. As illustrated in the lower portion of FIG. 1, the side airbag apparatus of the present embodiment includes an impact sensor 160 and a control device 150, in addition to the airbag module 100. The control device 150 outputs control commands to the airbag module 100.

The impact sensor 160 is, for example, an acceleration sensor attached to a component such as a side pillar of the vehicle. The impact sensor 160 detects an impact from the side of the vehicle (the seat 10) due to, for example, a side collision and outputs a detection signal. Based on a detection signal from the impact sensor 160, the control device 150 outputs a control signal for deploying the airbag 110 to the airbag module 100.

Figure 2:
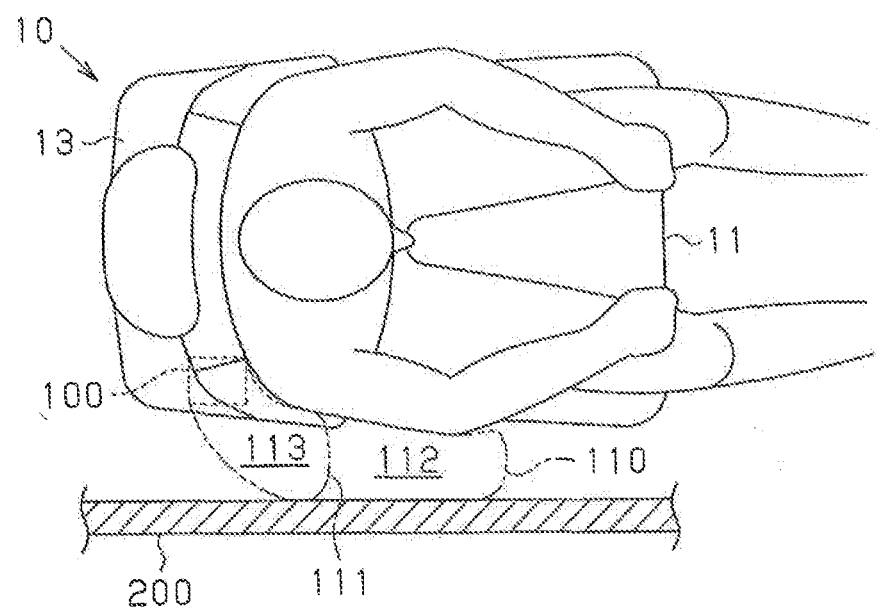
FIG. 2 is a top view of a seat in which the side airbag apparatus of FIG. 1 is installed.

The airbag module 100 accommodates the airbag 110, which is folded as described below. When the control device 150 outputs a control signal, the airbag 110 is deployed and inflated based on the signal as illustrated by lines formed by a long dash alternating with two short dashes in FIGS. 1 and 2. FIG. 2 is a top view showing the seat 10, in which the side airbag apparatus is installed. In FIG. 2, the right side corresponds to the front side of the vehicle, and the upper side corresponds to the center in the passenger compartment. The vehicle also has a seatbelt device for restraining the occupant seated on the seat 10. In FIGS. 1 and 2, the seatbelt device is not illustrated.

As indicated by a broken line FIG. 2, the airbag module 100 is accommodated in the backrest 13 of the seat 10 at a position close to a side wall 200 of the passenger compartment. When the impact sensor 160 detects an impact from the side of the vehicle, the airbag 110 is deployed and inflated to enter the narrow gap between the occupant and the passenger compartment side wall 200 as indicated by lines formed by a long dash alternating with two short dashes in FIG. 2. Accordingly, the airbag 110 is located between the occupant and the passenger compartment side wall 200 to reduce and absorb the impact from the side, thereby protecting the occupant.

Figure 3:
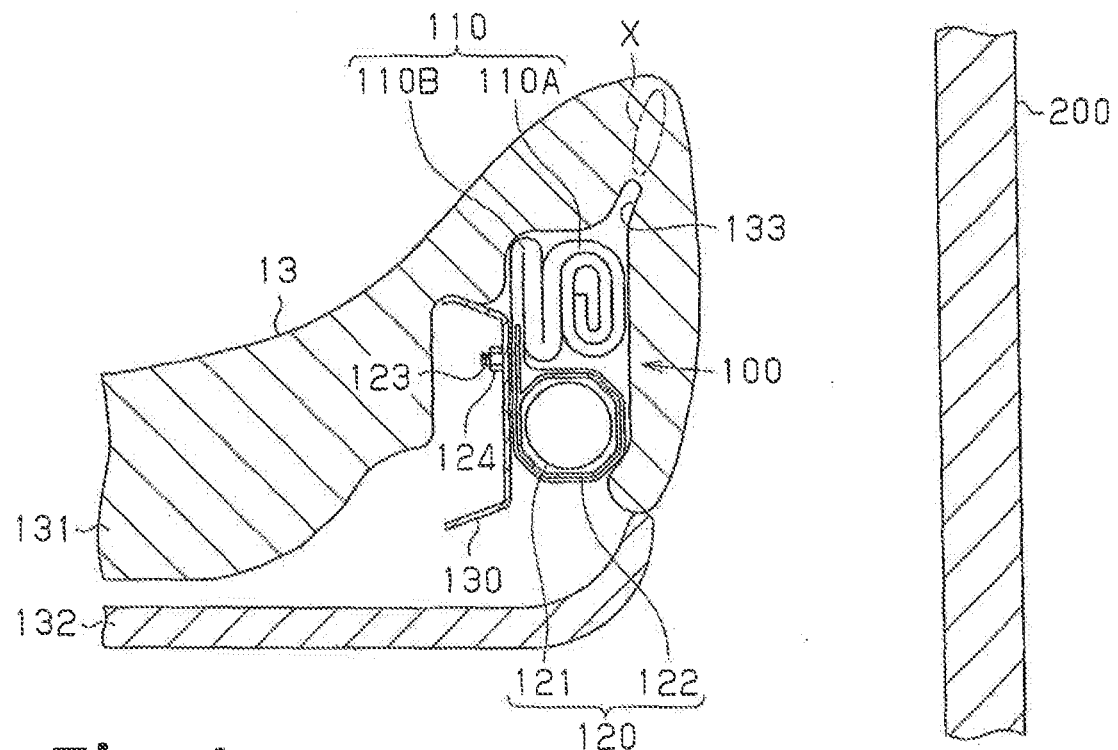
FIG. 3 is cross-sectional top view illustrating the airbag module installed in the seat.

With reference to FIG. 3, the structure of the airbag module 100 and the structure of the backrest 13, which accommodates the airbag module 100, will be described. In FIG. 3, the upside corresponds to the front side of the vehicle, and the left side corresponds to the center in the passenger compartment.

As shown in FIG. 3, a frame 130, which is the framework of the backrest 13, is located inside the backrest 13. The frame 130 is formed by bending a metal plate. A pad 131, which is made of an elastic material such as urethane foam, fills the space about the frame 130 in the backrest 13. The pad 131 forms a part against which an occupant leans. The pad 131 is covered with a seat surface material, which is not illustrated in FIG. 3. A part of the backrest 13 that is relatively closer to the rear of the vehicle, that is, the back face of the backrest 13, is covered with a hard back plate 132, which is formed of plastic.

As illustrated in a center of FIG. 3, a space for accommodating the airbag module 100 is provided in a side support of the backrest 13. The pad 131 has a slit 133, which extends from the front end of the space toward the front end of the side support. A part between the slit 133 and the front end of the side support (a part X surrounded by a line formed by a long dash alternating with two short dashes in FIG. 3) is designed to be broken when the airbag 110 is deployed and inflated.

The airbag module 100 includes the folded airbag 110 and an inflator assembly 120. The inflator assembly 120 includes an inflator 121, which functions as an inflation fluid generator, and a retainer 122 for accommodating the inflator 121. The inflator 121 ejects inflation gas for inflating the airbag 110. In the present embodiment, a part of the inflator assembly 120 is inserted into the airbag 110.

In the present embodiment, a pyrotechnic inflator is used as the inflator 121. The inflator 121 is substantially columnar. A gas generating agent (not shown), which generates inflation fluid, or inflation gas for inflating the airbag 110, is accommodated inside the inflator 121. A harness (not shown), which is wiring for applying control signals to the inflator 121, is connected one end in the longitudinal direction (the lower end in the present embodiment) of the inflator 121.

As the inflator 121, a type of a hybrid inflator may be used in which a partition wall of a high-pressure gas cylinder filled with high-pressure gas is broken by explosive to exhaust an inflation gas instead of a pyrotechnic inflator, which uses the above-mentioned gas forming agent.

The retainer 122, which accommodates the inflator 121, also functions as a diffuser for regulating the direction of discharge of inflation gas. Also, the retainer 122 functions as a holding member that fastens the inflator 121 to the frame 130 together with the airbag 110. The retainer 122 is shaped substantially as a cylinder by bending a metal plate. The retainer 122 has an opening (not shown), through which the inflation gas ejected by the inflator 121 is delivered to the interior of the airbag 110.

The retainer 122 is provided with bolts 123 (the number of which is two in the present embodiment) for fixing the retainer 122 to the frame 130. The airbag module 100 is fixed to the backrest 13 by threading nuts 124 to the bolts 123 with the bolts 123 passed through the frame 130 as illustrated in a center of FIG. 3. In this manner, the airbag module 100 is compactly accommodated and fixed to the backrest 13 by folding a part of the airbag 110 that is forward of the part that accommodates the inflator assembly 120 and placing the folded part in front of the inflator assembly 120 as shown in FIG. 3.

Figure 4:
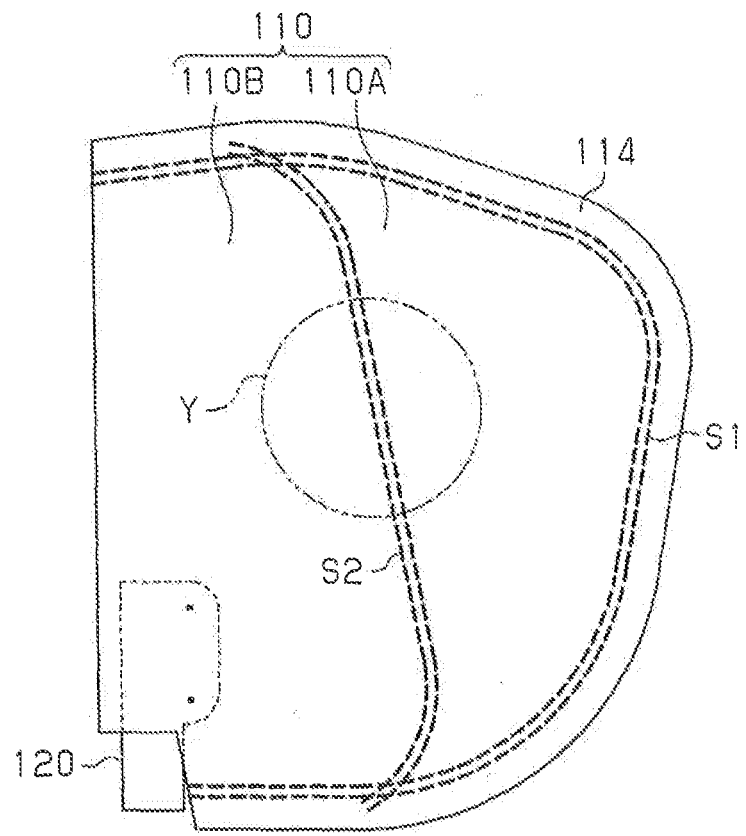
FIG. 4 is a side view showing the airbag before being folded.

The configuration of the airbag 110 will now be described with reference to FIGS. 4 and 5. In FIG. 4, the right side corresponds to the front side of the vehicle, and the upper side corresponds to the top of the vehicle. In FIG. 4, the passenger compartment side wall 200 is assumed to be located on the side relatively closer to the viewer of the drawing, and the center of the passenger compartment is assumed to be located on the side relatively farther from the viewer of the drawing.

The airbag 110 is formed by a base fabric 114 having a line-symmetric shape. The base fabric 114 is folded in half along a fold line defined in a center portion, and the edges of the base fabric 114 is sewn together as indicated by double broken line S1 of FIG. 4. As shown in FIG. 4, the base fabric 114 of the airbag 110 is folded back at a position relatively closer to the rear of the vehicle. The base fabric 114 is preferably formed of a material having high strength and flexibility so as to be easily folded. The material may be, for example, woven cloth formed of polyester threads or polyamide threads.

The airbag 110 has an opening at a left lower corner as viewed in FIG. 4, that is, at the lower end of the rear side, for receiving the inflator assembly 120. Through the opening, a part of the inflator assembly 120 is inserted into the airbag 110.

As shown in FIG. 5, a partition 111 is located inside the airbag 110. The partition 111 partitions the interior of the airbag 110 into a front chamber 112, which is located relatively closer to the front side of the vehicle, and a rear chamber 113, which is located relatively closer to the rear side of the vehicle. FIG. 5 is a perspective view, with a part cut away, illustrating the interior of the airbag 110 at a part Y, which is surrounded by a line formed by a long dash alternating with two short dashes in FIG. 4.

The partition 111 is formed by combining an upper panel 111A and a lower panel 111B. Specifically, the upper panel 111A and the lower panel 111E are laid onto each other such that edges of the upper panel 111A and the lower panel 111B are aligned. Next, as indicated by broken lines S3 in FIG. 5, the aligned edges on one side are sewn together except for a center portion, so that the upper panel 111A and the lower panel 111B are connected to each other. With a part above the sewn portion of the upper panel 111A and the lower panel 111B oriented upward, the upper panel 111A is folded upward. In this state, side edges of the upper panel 111A and the lower panel 111B are sewn to the base fabric 114 as indicated by the broken line 52 in FIG. 4. In this manner, the partition 111 is fixed inside the airbag 110.

The partition 111 is provided in the airbag 110 in the manner described above. The partition 111 partitions the interior of the airbag 110, which is deployed and inflated as indicated by lines formed by a long dash alternating with two short dashes in FIGS. 1 and 2, into the front chamber 112, which is located relatively closer to the front side of the vehicle, and the rear chamber 113, which is located relatively closer to the rear side of the vehicle. The position of the partition 111 in the front-rear direction of the vehicle is adjusted such that, when the airbag 110 is deployed, the position of the partition 111 substantially matches with the center of the upper body of the occupant seated on the seat 10 in the front-rear direction, as illustrated in FIGS. 1 and 2.

As indicated by broken lines S3 in FIG. 5, the upper panel 111A and the lower panel 111B are not sewn together at the middle of the partition 111 in the width direction of the vehicle. In the side airbag apparatus of the present embodiment, the unsewn part, where the upper panel 111A and the lower panel 111B are not sewn together, forms a communication passage 119 for allowing the rear chamber 113 and the front chamber 112 to communicate with each other. Parts of the upper panel 111A and the lower panel 111B corresponding to the communication passage 119 functions as a pressure regulating valve 118 for opening and closing the communication passage 119.

As shown in FIG. 4, the airbag 110 is partitioned by the partition 111, which is fixed to the base fabric 114 by the sewn portion indicated by broken lines S2, into a rear portion 110B, which is located relatively closer to the rear side of the vehicle and forms the rear chamber 113, and a front portion 110A, which is located relatively closer to the front side of the vehicle and forms the front chamber 112. The inflator assembly 120 is accommodated in the airbag rear portion 110B. Thus, when the inflator 121 ejects inflation gas, the inflation gas first fills the rear chamber 113 of the airbag rear portion 110B to inflate the airbag rear portion 110B. At this time, as the airbag rear portion 110B is inflated, the partition 111 receives a force that acts to pull the partition 111 in the width direction of the vehicle, that is, in the width direction of the seat. The force acts to cause the overlapping parts of the upper panel 111A and the lower panel 111B, which form the pressure regulating valve 118, to be tightly pressed against each other. Therefore, immediately after the airbag 110 starts being deployed and inflated, the pressure regulating valve 118 is closed. This restricts the flow of the inflation gas from the rear chamber 113 to the front chamber 112 via the communication passage 119. The inflation gas is thus not supplied to the front chamber 112 immediately after the start of deployment and inflation of the airbag rear portion 110B, so that the inflation of the airbag rear portion 110B is given priority.

When the airbag rear portion 110B is inflated and starts restraining the occupant, the airbag rear portion 110B starts receiving the load in the vehicle width direction from the occupant. When the inflated airbag rear portion 110B is laterally pressed in the vehicle width direction, the partition 111 is flexed. This weakens the force that acts to cause the overlapping parts of the upper panel 111A and the lower panel 111B, which form the pressure regulating valve 118, to be tightly pressed against each other. At this time, the upper panel 111A and the lower panel 111E are separated from each other at this overlapping section so that the pressure regulating valve 118 opens. This allows the inflation gas to flow through the communication passage 119, so that the inflation gas is supplied from the rear chamber 113 to the front chamber 112.

When the inflation gas flows into the front chamber 112 from the rear chamber 113 via the pressure regulating valve 118, the overlapping parts of the upper panel 111A and the lower panel 111B, which forms the pressure regulating valve 118, are reversed to the front chamber 112 through the communication passage 119. This causes the pressure regulating valve 118 to maintain the open state, in contrast, when the inflation gas acts to flow from the front chamber 112 to the rear chamber 113, the parts forming the pressure regulating valve 118 return to the rear chamber 113 so that the pressure regulating valve 118 is closed. That is, the pressure regulating valve 118 functions as a check valve, which allows flow of inflation gas from the rear chamber 113 to the front chamber 112, while inhibiting flow of inflation gas from the front chamber 112 to the rear chamber 113.

The front chamber 112 has a vent hole (not shown), through which the inflation gas supplied into the front chamber 112 can be discharged to outside of the airbag 110.

Hereinafter, a method for folding the airbag 110 of the side airbag apparatus, which is configured as described above, will be described with reference to FIGS. 6a to 10b.

FIG. 6a is a side view showing the airbag 110 in a spread state before being folded. In FIG. 6a, the right side corresponds to the front side of the vehicle, and the upper side corresponds to the upside of the vehicle. In FIG. 6a, the passenger compartment side wall 200 is assumed to be located on the side relatively closer to the viewer of the drawing, and the center of the passenger compartment is assumed to be located on the side relatively farther from the viewer of the drawing. FIG. 6b schematically shows the airbag 110 as viewed from the front of the vehicle.

In the side airbag apparatus of the present embodiment, a part of the airbag 110 below a part into which the inflator assembly 120 is inserted is folded upward as indicated by arrows in FIGS. 6a and 6b. Specifically, the airbag 110 is valley-folded along a fold line indicated by a line formed by a long dash alternating with a short dash in FIG. 6a. At this time, the lower end portion of the airbag 110 is folded back upward as indicated by a line formed by a long dash alternating with two short dashes in FIG. 6b, and onto a surface of the airbag 110 that faces the passenger compartment side wall 200.

FIG. 7a shows a state in which the lower end portion of the airbag 110 has been folded as described above. In FIG. 7a, the right side corresponds to the front side of the vehicle, and the upper side corresponds to the upside of the vehicle, as in the case of FIG. 6a. In FIG. 7a, the passenger compartment side wall 200 is assumed to be located on the side relatively closer to the viewer of the drawing, and the center of the passenger compartment is assumed to be located on the side relatively farther from the viewer of the drawing. FIG. 7b schematically shows the airbag 110 as viewed from below.

In the side airbag apparatus of the present embodiment, the airbag front portion 110A, which forms the front chamber 112, is folded by roll-folding. On the other hand, the airbag rear portion 110B, which forms the rear chamber 113, is folded by accordion-folding. In this manner, the airbag 110 is folded and shortened toward the inflator assembly 120.

As indicated by arrows in shown in FIGS. 7a, and 7b, the airbag front portion 110A is folded by roll-folding. Specifically, the airbag front portion 110A is repeatedly folded back in one direction from the front end so that a surface of the airbag front portion 110A that faces the passenger compartment side wall 200 is tucked inward. That is, the airbag front portion 110A is folded such that, of the opposite sides of the airbag front portion 110A, the side that is father from the seating position on the seat is tucked inward. FIGS. 8a and 8b show a state in which the airbag front portion 110A has been roll-folded. In FIG. 8a, the right side corresponds to the front side of the vehicle, and the upper side corresponds to the upside of the vehicle, as in the case of FIGS. 6a and 7a. In FIG. 8a, the passenger compartment side wall 200 is assumed to be located on the side relatively closer to the viewer of the drawing, and the center of the passenger compartment is assumed to be located on the side relatively farther from the viewer of the drawing. FIG. 8b schematically shows the airbag 110 as viewed from below.

After the airbag front portion 110A is folded by roll-folding as described above, the airbag rear portion 110B is folded by accordion-folding, in which the folding direction is alternately switched. Specifically, as indicated by arrow of broken lines in FIGS. 8a and 8b, the airbag 110 is mountain folded along a fold line that is indicated by a solid line. Accordingly, the roll-folded airbag front portion 110A is folded onto the side of the airbag rear portion 110B that faces the center of the passenger compartment. Next, as indicated by arrows of solid lines in FIGS. 8a and 8b, the airbag 110 is valley folded along a fold line that is indicated by a line formed by a long dash alternating with a short dash. Accordingly, a part of the airbag rear portion 1105 that has been folded onto the side facing the center of the passenger compartment is folded back onto the surface of the airbag 110 that faces the passenger compartment side wall 200. Therefore, the airbag 110 is folded to be contracted in a space in front of the inflator assembly 120 as shown in FIG. 9a to have a transitional form, which extends vertically.

Figure 9A:
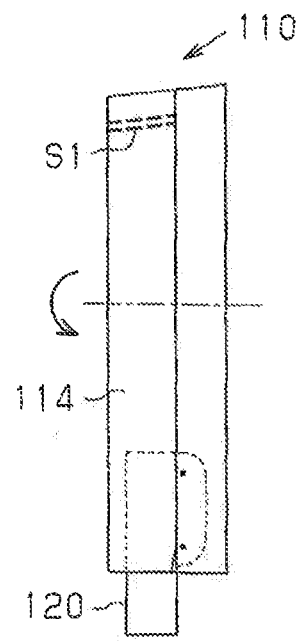
FIG. 9a is a side view showing a method for folding the airbag, which has been subjected to roll-folding and accordion-folding, into a final accommodation form.
Figure 9B:
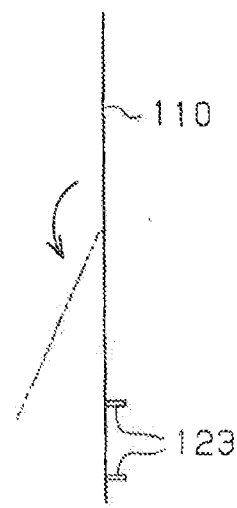
FIG. 9b is a schematic diagram illustrating the airbag of FIG. 9a as viewed from the front of the vehicle.

In FIG. 9a, the right side corresponds to the front side of the vehicle, and the upper side corresponds to the upside of the vehicle, as in the case of FIGS. 6a to 8a. In FIG. 9a, the passenger compartment side wall 200 is assumed to be located on the side relatively closer to the viewer of the drawing, and the center of the passenger compartment is assumed to be located on the side relatively farther from the viewer of the drawing. FIG. 9b schematically shows the airbag 110 as viewed from the front of the vehicle.

In the side airbag apparatus of the present embodiment, the airbag 110 in the transitional form, which extends in the vertical direction as shown in FIGS. 9a and 9b, is folded substantially in half in the vertical direction. This changes the airbag 110 into an accommodation form for being accommodated in the backrest 13. Specifically, the airbag 110 is folded along a fold line indicated by a line formed by a long dash alternating with a short dash in FIG. 9a, so that the upper portion of the airbag 110 is folded back downward as illustrated by a line formed by a long dash alternating with two short dashes in FIG. 9b.

Figure 10A:
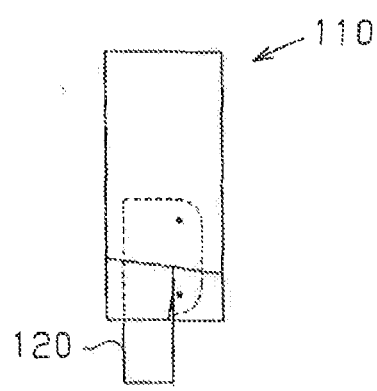
FIG. 10a is a side view showing the airbag, which has been folded into the final accommodation form.
Figure 10B:
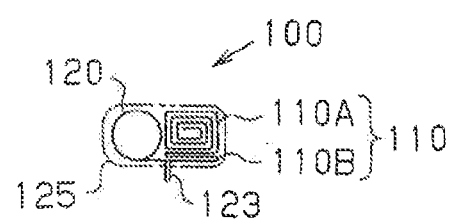
FIG. 10b is a schematic diagram illustrating the airbag as viewed from the bottom.

FIGS. 10a and 10b show a state in which the upper portion of the airbag 110 has been folded as described above. In FIG. 10a, the right side corresponds to the front side of the vehicle, and the upper side corresponds to the upside of the vehicle, as in the case or FIGS. 6a to 9a. In FIG. 10a, the passenger compartment side wall 200 is assumed to be located on the side relatively closer to the viewer of the drawing, and the center of the passenger compartment is assumed to be located on the side relatively farther from the viewer of the drawing. FIG. 10b schematically shows the airbag 110 as viewed from below.

In an accommodation form in which the airbag 110 accommodates the inflator assembly 120 and the part forward of the accommodating part is folded, the airbag 110 and the inflator assembly 120 are wrapped with a protective fabric 125 shown by a line formed by a long dash alternating with two short dashes in FIG. 10b. The airbag module 100 is thus completed. The protective fabric 125 is designed to be easily torn when the airbag 110 is deployed and inflated.

The above described airbag module 100 is fixed to the frame 130 while being accommodated in the backrest 13 as shown in FIG. 3.

Hereafter, operation of the side airbag apparatus of the present embodiment will be described.

When an impact is applied to the passenger compartment side wall 200 from a side of the vehicle (the seat 10), the impact sensor 160 detects the impact and outputs a detection signal to the control device 150. Based on the detection signal, the control device 150 outputs an activation signal for activating the inflator 121 to the inflator 121. In response to the activation signal, the inflator 121 generates inflation gas.

The inflation gas is first supplied to the rear chamber 113 of the airbag 110, which accommodates the inflator 121. At an early stage of a supply period in which the inflation gas is supplied, the pressure regulating valve 118 is closed to restrict flow of the inflation gas from the rear chamber 113 to the front chamber 112 via the communication passage 119 (refer to FIG. 5). Thus, in the airbag 110, the inflation of the airbag rear portion 110B is given priority over that of the front portion 110A. At this time, no inflation gas is supplied to the front chamber 112, so that the airbag front portion 110A is not inflated. However, the airbag front portion 110A can be deployed without being inflated (refer to FIG. 11*b*). That is, the front portion 110A can be unfolded. This is because the airbag rear portion 110B is moved forward when deployed and inflated, and the movement is transmitted to the airbag front portion 110A.

Also, the airbag rear portion 110B, which forms the rear chamber 113, is folded by accordion-folding. Since the accordion-folding is easily undone, the airbag rear portion 1102 is quickly deployed and inflated.

Further, when the impact from the side of the vehicle moves the passenger compartment side wall 200 toward the occupant, the airbag rear portion 111B, which is deployed beside the occupant, is pressed against the occupant. The occupant is therefore restrained by the airbag rear portion 110B and protected against the impact. In the present embodiment, since the airbag rear portion 110B is quickly inflated, the occupant is quickly restrained and protected by the airbag rear portion 110B. When the occupant is restrained in this manner, a load is applied to the airbag rear portion 110B, so that the pressure regulating valve 118 is opened during the supply period of the inflation gas. This permits flow of the inflation gas from the rear chamber 113 to the front chamber 112 via the communication passage 119.

When the pressure regulating valve 118 is opened, the inflation gas in the rear chamber 113 starts being supplied to the front chamber 112 via the communication passage 119. Thus, the airbag front portion 110A of the airbag 110 starts being deployed and inflated after the airbag rear portion 110B starts restraining the occupant. At this time, even if an obstacle exists in front of the airbag 110 (the front chamber 112) and hinders proper deployment and inflation of the airbag front portion 110A, the quickly deployed airbag rear portion 1102 restrains and protects the occupant. That is, the obstacle does not adversely affect the operation.

The airbag front portion 110A, which forms the front chamber 112, is roll-folded. Compared to accordion-folding, roll-folding is more difficult to reverse. However, roil-folding permits easier entry into a narrow space. Therefore, the airbag front portion 110A is deployed and inflated to enter the narrow gap between the occupant and the passenger compartment side wall 200.

Figure 11A:
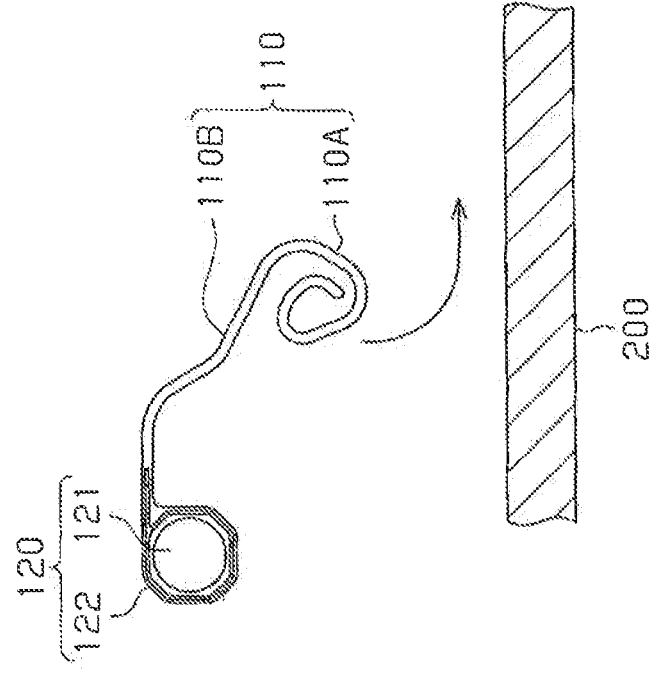
FIGS. 11a and 11b are explanatory diagrams showing a process in which the airbag of the side airbag apparatus according to the embodiment of FIG. 1 is unfolded when being deployed and inflated.
Figure 11B:
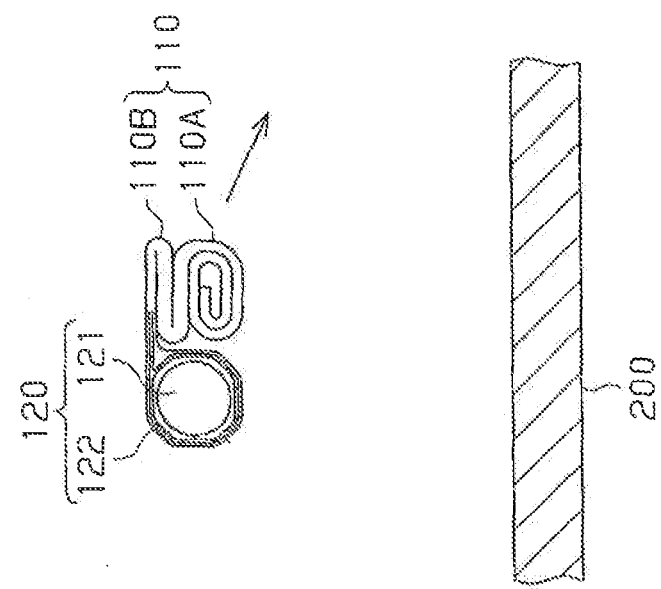

FIGS. 11*a* and 11*b* are schematic diagrams showing a manner in which the airbag 110 is deployed. In FIGS. 11*a* and 11*b*, the right side corresponds to the front side of the vehicle, and the lower side corresponds to the passenger compartment side wall 200. For purposes of illustration, the backrest 13 and its components such as the frame 130 and the pad 131 are not illustrated in FIGS. 11*a* and 11*b*.

When the inflator 121 ejects inflation gas, the folding of the airbag 110 that has been applied when the airbag 110 is folded from the transitional form to the accommodation form is undone. At the same time, the inflation gas enters the airbag 110, and the pressure of the inflation gas deploys and inflates the airbag 110 while undoing the accordion-folding and the roll-folding. For purposes of illustration, FIGS. 11*a* and 11*b* only illustrate the manner in which the accordion-folding and the roll-folding are undone (deployed).

As shown in FIG. 11*a*, in the side airbag apparatus of the present embodiment, the accordion-folded airbag rear portion 110B and the roll-folded airbag front portion 110A are arranged side-by-side in the width direction of the vehicle (in the vertical direction as viewed in FIGS. 11*a* and 11*b*). Thus, deployment of the airbag rear portion 110B is unlikely to be hindered by the airbag front portion 110A. This in turn allows the airbag rear portion 110B to be quickly deployed forward as the inflator 121 ejects inflation gas.

Also, the airbag rear portion 110B is located at a position relatively closer to the center of the passenger compartment, while the airbag front portion 110 is located at a position relatively closer to the passenger compartment side wall 200. That is, the airbag rear portion 110B is located in front of the inflator 121 and in the vicinity of the seating position of the seat 10, and the airbag front portion 110A is located in front of the inflator 121 and at a position relatively farther from the seating position of the seat 10. Therefore, when the accordion-folding of the airbag rear portion 110B is undone, the airbag front portion 110A is pushed diagonally forward and deployed toward the passenger compartment side wall 200 as indicated by an arrow in FIG. 11*a*.

The airbag front portion 110A is folded by roll-folding, in which the airbag front portion 110A is repeatedly folded such that the side facing the passenger compartment side wall 200 is tucked inward. Therefore, when the airbag front portion 110A is deployed, the roll-folded portion is unfolded further toward the passenger compartment side wall 200 than the part that has already been unfolded as indicated by an arrow in FIG. 11*b*.

The above described embodiment has the following advantages.

(1) The airbag 110 is partitioned into the front chamber 112 and the rear chamber 113 by the partition 111. The partition 111 has the communication passage 119, which connects the front chamber 112 and the rear chamber 113 to each other. The partition 111 also has the pressure regulating valve 118 (FIG. 5). The pressure regulating valve 118 is closed at the early stage of the supply period, in which the inflator 121 supplies inflation gas to the airbag 110, thereby restricting flow of inflation gas from the rear chamber 113 to the front chamber 112 via the communication passage 119. The pressure regulating valve 118 is opened in the supply period of inflation gas allow flow of the inflation gas from the rear chamber 113 the front chamber 112 via the communication passage 119. The airbag rear portion 110B, which forms the rear chamber 113, is accordion-folded (FIGS. 8*a* and 8*b*), and the airbag front portion 110A, which forms the front chamber 112, is roll-folded (FIGS. 7*a* and 7*b*). The airbag front portion 110A and the airbag rear portion 110B are located forward of the inflator 121 (FIG. 3).

As described above, accordion-folding is easily undone and deployed. Since the airbag rear portion 110B is accordion-folded, it is quickly pushed forward. Also, deployment of roll-folding is unlikely to be hindered by an obstacle and easily enters a narrow space. Since the airbag front portion 110A is roll-folded, it can quickly and easily enter the narrow gap between the occupant and the passenger compartment side wall 200.

Also, the balance of pressure between the rear chamber 113 and the front chamber 112 is adjusted through the pressure regulating valve 118 to control times at which the airbag front portion 110A and the rear portion 110B are deployed and inflated.

The airbag rear portion 110, which is close to the backrest 13, receives load earlier than the front portion 110A. In the side airbag apparatus of the present embodiment, the pressure regulating valve is closed until the airbag rear portion 110B is deployed and inflated to restrain the occupant, and the airbag rear portion 110E receives load. Therefore, the inflator gas that has been supplied to the rear chamber 113 by the inflator 121 is prevented from flowing out to the front chamber 112 via the communication passage 119, so that the airbag rear portion 110B is quickly deployed and inflated. When the deployed and inflated airbag rear portion 110B restrains the occupant and starts receiving load, the pressure regulating valve 118 is opened. When the pressure regulating valve 118 is opened, the inflation gas is supplied to the front chamber 112 via the communication passage 119 to inflate the airbag front portion 110A, which has been deployed between the occupant and the passenger compartment side wall 200.

As a result, even when an obstacle exists in front of the airbag 110, the airbag rear portion 110B is capable of quickly restraining and protecting an occupant.

Also, the inflation gas in the rear chamber 113 is supplied to the front chamber 112 with a lag. Therefore, the airbag front portion 110A, which has been deployed between the occupant and the passenger compartment side wall 200, is inflated to reliably protect the occupant while the internal pressure of the rear chamber 113 is prevented from being excessively high.

(2) The pressure regulating valve 118 is opened by the load that is generated when the airbag 110 restrains an occupant during the supply period of the inflation gas (FIG. 5). Therefore, in addition to the advantage of the above item (1), the airbag front portion 110A is inflated after the airbag rear portion 110B starts restraining and protecting an occupant.

(3) The roll-folded airbag front portion 110A and the accordion-folded airbag rear portion 110B are arranged forward of the inflator 121, while being arranged side-by-side in the vehicle width direction (FIG. 3). Therefore, deployment of the airbag rear portion 110B is unlikely to be hindered by the airbag front portion 110A, so that the airbag rear portion 110B is quickly pushed forward, deployed and inflated.

(4) The airbag rear portion 110B is located at a position relatively closer to the center of the passenger compartment, while the airbag front portion 110A is located at a position relatively closer to the passenger compartment side wall (FIG. 3). Since the airbag rear portion 110B, which is located closer to the center of the passenger compartment, is quickly deployed forward, the occupant is quickly restrained and protected by the airbag rear portion 110B.

Also, when the accordion-folding of the airbag rear portion 110B is undone, the airbag front portion 110A is pushed diagonally forward and toward the passenger compartment side wall 200. This allows the airbag front portion 110A to be deployed along the passenger compartment side wall 200 and to quickly enter the gap between the occupant and the passenger compartment side wall 200.

(5) The airbag front portion 110A is folded by roll-folding, in which the airbag front portion 110A is repeatedly folded such that the side of the airbag 110 facing the passenger compartment side wall 200 is tucked inward. As described above with reference to FIG. 11 b, when the airbag front portion 110A is deployed, the roll-folded portion is unfolded further toward the passenger compartment side wall 200 than the part that has already been unfolded. Thus, according to the airbag apparatus of the above described embodiment, the airbag front portion 110A is easily deployed along the passenger compartment side wall 200.

The above embodiment may be modified as follows.

In the above illustrated embodiment, the airbag front portion 110A is roll-folded by repeatedly folding the airbag front portion 110A in one direction such that the side facing the passenger compartment side wall 200 is tucked inward. Conversely, the airbag front portion 110A may be roll-folded by repeatedly folding the airbag front portion 110A such that the side facing the center of the passenger compartment is tucked inward. In this case, although the advantage of item (5) cannot be achieved, the advantages of items (1) to (4) are achieved.

In the above illustrated, embodiment, the accordion-folded airbag rear portion 110B is located at a position relatively closer to the center of the passenger compartment, and the roll-folded airbag front portion 110A is located at a position relatively closer to the passenger compartment side wall 200. Accordingly, the airbag rear portion 110B and the airbag front portion 110A are arranged side-by-side along the width of the vehicle. Alternatively, the positions of the airbag front portion 110A and the airbag rear portion 110B in the direction of the vehicle width may be reversed. That is, the accordion-folded airbag rear portion 110B may be located at a position relatively closer to the passenger compartment side wall 200, and the roll-folded airbag front portion 110A may be located at a position relatively closer to the center of the passenger compartment. In this case, although the advantage of item (4) is not easily achieved, the advantages of items (1) to (3) are achieved.

Alternatively, the airbag front portion 110A may be roll-folded, and the airbag rear portion 110B may be accordion-folded before the lower portion of the airbag 110 is folded upward.

The airbag front portion 110A and the rear portion 110B may be arranged in a manner different from that in the above illustrated embodiment, as long as the airbag front and rear portions 110A, 110B are located forward of the inflator 121.

Figure 12:
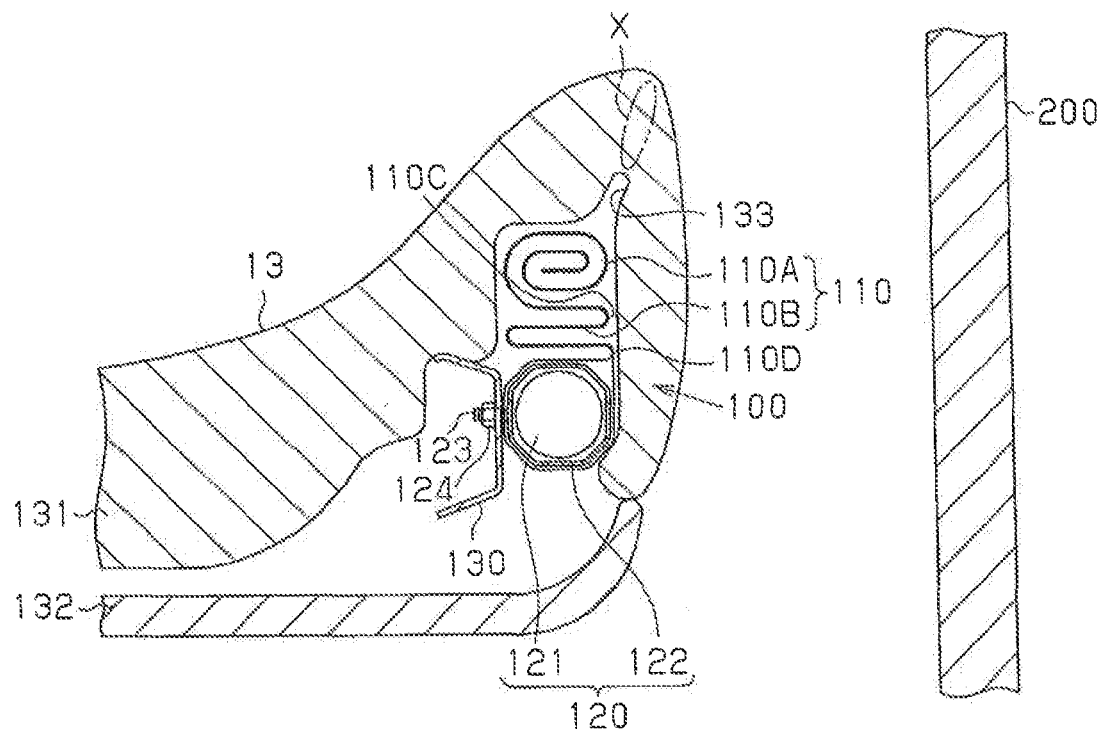
FIG. 12 is a cross-sectional top view of a side airbag apparatus according to a modification, illustrating a state in which an airbag module is installed in the seat.
Figure 13:
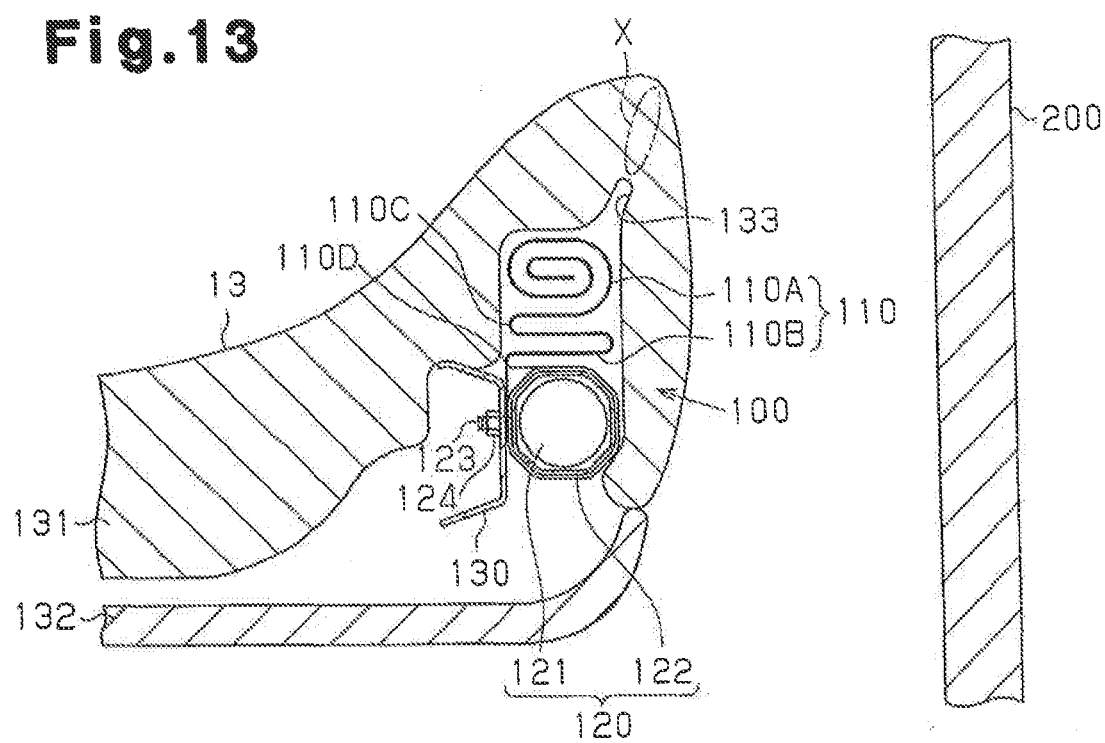
FIG. 13 is a cross-sectional top view of a side airbag apparatus according to another modification, illustrating a state in which an airbag module is installed in the seat.

FIGS. 12 and 13 illustrate examples. In FIGS. 12 and 13, the same reference numerals are given to parts that are the same as or like corresponding parts of the above illustrated embodiment. In the modifications of FIG. 12 or FIG. 13, an airbag rear portion 110B, which is accordion-folded, is located forward of an inflator 121, and an airbag front portion 110A, which is roll-folded, is located forward of the airbag rear portion 110B. In this case also, the airbag front portion 110A and the rear portion 110B, which are arranged in front of the inflator assembly 120, are deployed and inflated forward with a lag. Therefore, the modifications achieve the advantages of items (1) and (2).

The difference between the modification shown in FIG. 12 and the modification shown in FIG. 13 is the directions in which the airbag front portion 110A is roll-folded are opposite to each other.

In the modification shown in FIG. 12, the airbag front portion 110A is repeatedly folded in one direction such that the side facing the passenger compartment side wall 200 is tucked inward. In this case, a boundary 110C between the airbag rear portion 110B and the airbag front portion 110A is located on the side facing the passenger compartment side wall 200. Also, a boundary 110C between the accordion-folded part of the airbag rear portion 110B and the non-folded part (a part surrounding the inflator assembly 120) is located on the side facing the passenger compartment side wall 200. The modification shown in FIG. 12 achieves the advantage of item (5). That is, when the airbag front portion 110A is deployed, the roll-folded portion is unfolded further toward the passenger compartment side wall 200 than the part that has already been unfolded. This allows the airbag front portion 110A to be easily deployed along the passenger compartment side all 200.

In the modification shown in FIG. 13, the airbag front portion 110A is repeatedly folded in one direction such that the side facing the center of the passenger compartment is tucked inward. In this case, a boundary 110C between the airbag rear portion 110B and the airbag front portion 110A is located on the side facing the center of the passenger compartment. Also, a boundary 110D between the accordion-folded part of the airbag rear portion 1102 and the non-folded part (a part surrounding the inflator assembly 120) is located on the side facing the center of the passenger compartment. The modification shown in FIG. 13 cannot easily achieve the advantage of item (5).

In the illustrated embodiment, the airbag 110 is formed by folding the single base fabric 114 in half and sewing it into a bag shape. Alternatively, two base fabrics may be overlaid onto each other and sewn together to form an airbag. Further, three or more base fabrics may be connected together to form an airbag.

In the illustrated embodiment, the airbag 110 is formed by sewing a base fabric 114. Alternatively, the airbag 110 may be formed by bonding a base fabric using an adhesive. Also, instead of forming the partition 111 by sewing the upper panel 111A and the lower panel 111B together, the partition 111 may be formed by bonding the panels 111A and 111B together using adhesive.

In the above illustrated embodiment, the airbag 110 folded into an accommodation form and the inflator assembly 120 are wrapped with the protective fabric 125 to form the airbag module 100. However, the airbag module 100 does not necessarily have to be wrapped with a protective fabric 125. Also, the airbag module 100 may be formed by accommodating an airbag 110 and an inflator assembly 120 in a box-like case.

The partition 111 may be formed by a single member (fabric piece).

In the above illustrated embodiment, the upper panel 111A and the lower panel 111B, which form the partition 111, are overlaid onto each other and sewn to each other with a part remained unsewn, so that the communication passage 119 and the pressure regulating valve 118 are formed. However, the structure of the pressure regulating valve 118 may be changed as necessary. For example, a pressure regulating valve may be formed by a member that is different from members forming the partition 111, and thus the formed pressure regulating valve may be attached to the communication passage 119 in the partition 111.

In the above described embodiment, one pressure regulating valve 118 and one communication passage 119 are formed at the center of the partition 111. Alternatively, two or more pressure regulating valves 118 and two or more communication passages 119 may be formed.

In the above illustrated embodiment, substantially the entirety of the airbag 110 is inflated. However, the airbag 110 may have at a part a non-inflated portion, which is neither supplied with inflation gas nor inflated.

The order of the accordion-folding of the airbag rear portion 110B and the roll-folding of the airbag front portion 110A is not particularly restricted. The airbag front portion 110A may be folded after the airbag rear portion 110B is folded. Also, the airbag front portion 110A and the airbag rear portion 110B may be folded substantially simultaneously.

The present invention may be applied to a side airbag apparatus installed in a vehicle seat 10 that faces in a direction other than the forward direction, for example, in a vehicle seat that faces sideways. In this case, when an impact is applied to a side of the vehicle seat 10 (in the front-rear direction of the vehicle), the side airbag apparatus protects an occupant from the impact.

Besides passenger vehicles, the present invention may be applied to industrial vehicles of various types.

The present invention may be applied not only to the airbag apparatus installed in a seat of motor vehicles, but also to side airbag apparatuses installed in a seat of other transport vehicles such as aircrafts and ships.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus for being installed in a seat of a vehicle, the side airbag apparatus comprising:
    an airbag having a front portion, in which a front chamber is formed, a rear portion, in which a rear chamber is formed, and a partition, which partitions the front chamber and the rear chamber from each other;
    an inflation fluid generator, which is accommodated in the rear chamber and supplies inflation fluid to the airbag;
    a communication passage, which is formed in the partition to connect the front chamber and the rear chamber to each other; and
    a pressure regulating valve provided in the communication passage, wherein, at an early stage of a supply period during which the inflation fluid generator supplies the inflation fluid to the airbag, the pressure regulating valve is closed to restrict flow of the inflation fluid from the rear chamber to the front chamber via the communication passage, and wherein the pressure regulating valve is opened during the supply period to permit the inflation fluid to flow therethrough, wherein
    the front portion of the airbag is folded toward the inflation fluid generator by roll-folding, in which the airbag front portion is repeatedly folded in one direction,
    the rear portion of the airbag is folded toward the inflation fluid generator by accordion-folding, in which the direction of folding is alternately changed,
    the roll-folded airbag front portion and the accordion-folded airbag rear portion are located in front of the inflation fluid generator,
    the inflation fluid is supplied to the rear chamber by the inflation fluid generator,
    the inflation fluid is supplied from the rear chamber to the front chamber through the communication passage when the pressure regulating valve is opened,
    the rear chamber is inflated prior to the front chamber, and
    the roll-folded airbag front portion includes the front chamber and a part of the rear chamber, inflation of which is done prior to inflation of the front chamber.

2. The side airbag apparatus according to claim 1, wherein, in a state in which the airbag rear portion is deployed and inflated, the pressure regulating valve is opened when a load is applied to the airbag rear portion.

3. The side airbag apparatus according to claim 1, wherein the airbag front portion and the airbag rear portion are arranged in front of the inflation fluid generator, while being arranged side-by-side in the direction of the width of the seat.

4. The side airbag apparatus according to claim 3, wherein the airbag rear portion and the airbag front portion are arranged in front of the inflation fluid generator, while being arranged side-by-side, such that the airbag rear portion is located at a position in front of the inflation fluid generator and in the vicinity of a seating position of the seat, and that the airbag front portion is located at a position in front of the inflation fluid generator and away from the seating position.

5. The side airbag apparatus according to claim 3, wherein
    the airbag front portion has a pair of opposite sides facing each other in the width direction of the seat, and
    the airbag front portion is folded toward the inflation fluid generator by roll-folding, in which the airbag front portion is repeatedly folded in one direction, such that, of the pair of the opposite sides, the side farther from the seating position of the seat is tucked inward.

6. The side airbag apparatus according to claim 1, wherein
    the airbag rear portion is located in front of the inflation fluid generator, and the airbag front portion is located in front of the airbag rear portion.

7. The side airbag apparatus according to claim 1, wherein the pressure regulating valve is constructed as a check valve, which inhibits flow of inflation fluid from the front chamber to the rear chamber.

8. The side airbag apparatus according to claim 1, wherein the airbag is arranged at such a position that, when the airbag is deployed, the partition is aligned with the upper body of an occupant seated on the seating position of the seat.

* * * * *